(12) United States Patent
Lee et al.

(10) Patent No.: US 7,259,938 B2
(45) Date of Patent: Aug. 21, 2007

(54) ACTUATOR LATCH FOR DISK DRIVE

(75) Inventors: Chul-Woo Lee, Seongnam-Si (KR); Ki-Tag Jeong, Gyeonggi-Do (KR); Tae-Soo Kim, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 10/872,301

(22) Filed: Jun. 18, 2004

(65) Prior Publication Data

US 2004/0257709 A1    Dec. 23, 2004

(30) Foreign Application Priority Data

Jun. 20, 2003    (KR)    ...................... 10-2003-0040104

(51) Int. Cl.
*G11B 21/22*    (2006.01)
(52) U.S. Cl. ..................................... 360/256
(58) Field of Classification Search ............... 360/256, 360/256.2, 256.3, 256.4, 256.5, 256.6
See application file for complete search history.

(56) References Cited

U.S. PATENT DOCUMENTS

| | | | | |
|---|---|---|---|---|
| 5,363,261 A | | 11/1994 | Eckberg et al. ............. | 360/105 |
| 5,365,389 A | | 11/1994 | Jabbari et al. .............. | 360/105 |
| 5,483,399 A | * | 1/1996 | Jeong et al. ............. | 360/256.2 |
| 5,742,455 A | * | 4/1998 | Boutaghou ................ | 360/256.5 |
| 6,061,207 A | * | 5/2000 | Jang ......................... | 360/256.3 |
| 6,275,357 B1 | * | 8/2001 | Jang ......................... | 360/256.3 |
| 6,529,349 B1 | | 3/2003 | Byun et al. .............. | 360/256.4 |
| 6,822,835 B2 | * | 11/2004 | Kim ......................... | 360/256.2 |

OTHER PUBLICATIONS

Korean Patent Application No. 10-1993-0009320 to Jeong et al. published Dec. 10, 1994 (w/ English cover sheet).
Japanese Patent Application No. 08-039804 to Yasuda published Sep. 5, 1997 (w/ English Abstract).
Japanese Patent Application No. 11-023938 to Masaya published Aug. 11, 2000 (w/ English Abstract).
Japanese Patent Application No. 2002-321447 to Dokan published Jun. 6, 2003 (w/ English Abstract).

* cited by examiner

*Primary Examiner*—Tianjie Chen
(74) *Attorney, Agent, or Firm*—Monica H. Choi

(57) ABSTRACT

An actuator latch for a disk drive comprises at least one damping structure disposed at a wall within a recess of a latch body. Such a damping structure absorbs impact force between the latch body and a distal end of the actuator to minimize noise at a transducer on the actuator and to preserve the integrity of the transducer and actuator over time. The recess of the latch body engages with the distal end of the actuator for maintaining the position of the transducer within a parking zone. The damping structure exerts force on the distal end of the actuator with the force being used toward stopping rotation of the actuator.

20 Claims, 7 Drawing Sheets

ACTUATOR LATCH FOR DISK DRIVE

CROSS-REFERENCE TO RELATED APPLICATION(S)

The present application claims priority under 35 U.S.C. §119 to Korean Patent Application No. 2003-40104, filed on Jun. 20, 2003, which is incorporated herein by reference in its entirety.

TECHNICAL FIELD

The present invention relates generally to disk drives such as HDD's (hard disk drives), and more particularly, to an actuator latch having damping structures for minimizing noise and impact force on an actuator of a disk drive.

BACKGROUND OF THE INVENTION

Figure 1:
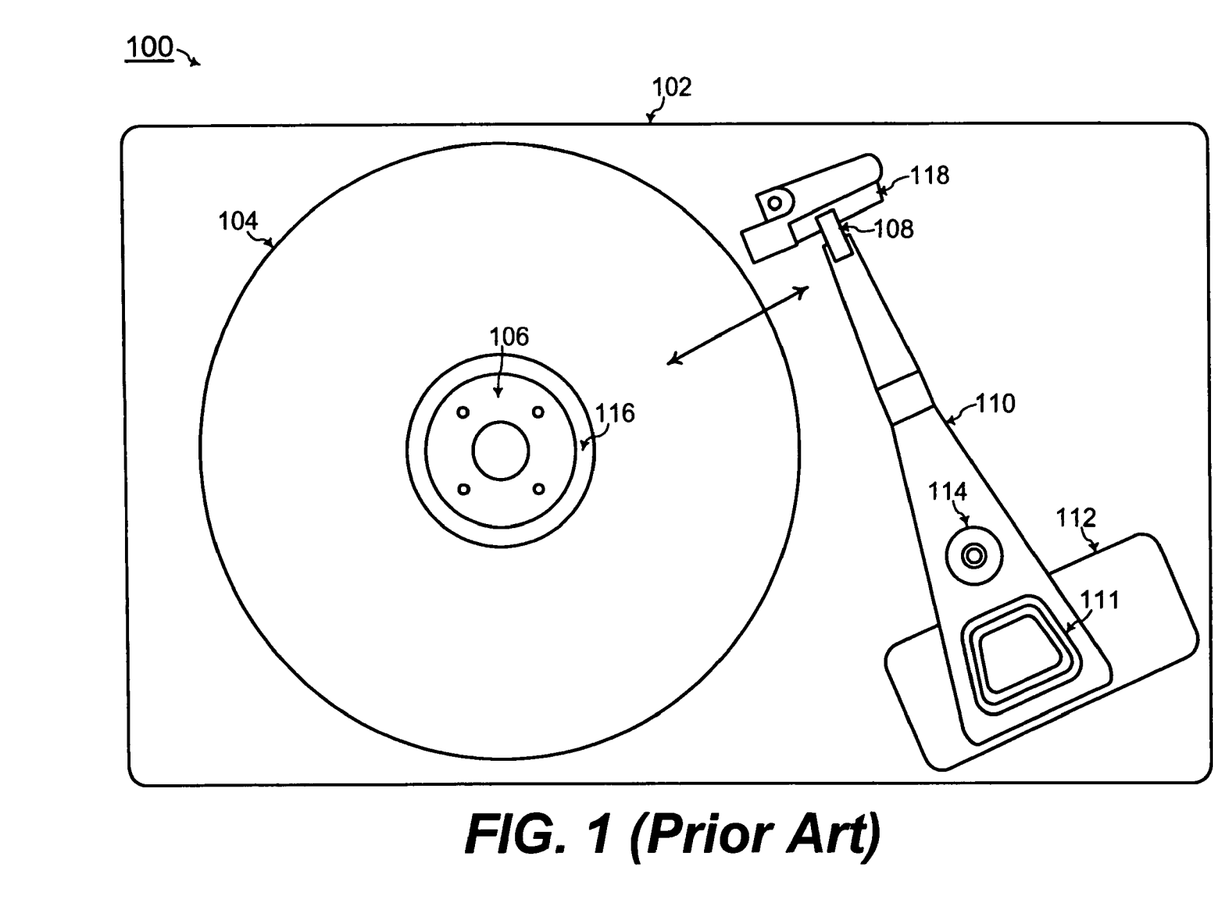
FIG. 1 shows components of a conventional disk drive, according to the prior art.

Referring to FIG. 1, a disk drive 100 enclosed in a casing 102 includes a disk 104. The disk drive 100 may be for a HDD (hard disk drive) for example that stores data magnetically. The disk 104 is typically part of a plurality of disks stacked for providing higher data capacity. The disk 104 is spun about a center axis by a spindle motor 106. A transducer 108 is carried and moved by an actuator 110 along the radial direction of the disk 104 that is spinning, for accessing the disk 104 during a read/write operation. Current provided to a voice coil 111 on the actuator along with the magnetic field of magnets 112 cause the actuator 110 to rotate about a pivot 114. Such rotation about the pivot 114 results in movement of the transducer 108 along the radial direction of the disk 104.

For accessing the disk 104 during a read/write operation, the disk 104 is spinning at a high enough speed such that an aerodynamic cushion is developed between the disk 104 and the transducer 108. Thus, the transducer 108 floats over the disk 104 and does not contact the disk 104 during such access. When the disk 104 is not spinning, the aerodynamic cushion is no longer available to float the transducer 108 above the disk 104. For preventing damage to the transducer 108 or the disk 104 from contact between such components, the transducer 108 is stationed at a parking zone when the disk 104 is not spinning. The parking zone may be an inner radial portion 116 of the disk 104 or may be provided as a separate parking zone 118 apart from the disk 104. Such operation and components of the disk drive 100 are known to one of ordinary skill in the art.

Additionally for preventing damage to the transducer 108 or the disk 104 from contact between such components, the position of the transducer 108 is desired to be maintained within the parking zone 116 or 118 even when external force is applied on the disk drive 100. Such an external force is especially likely when the disk drive 100 is part of a portable system that is prone to be bumped or dropped. U.S. Pat. No. 5,365,389 and Japanese Publication No. 1997-231695 disclose stop limits that use magnets for latching the actuator to a predetermined position. U.S. Pat. No. 5,363,261 discloses an actuator latch that also uses magnets for keeping the transducer at a parking zone. However, relying on magnetic force is disadvantageous because an external force that is greater than such magnetic force could dislodge the transducer 108 from the parking zone 118 and onto the disk 104.

Figure 2:
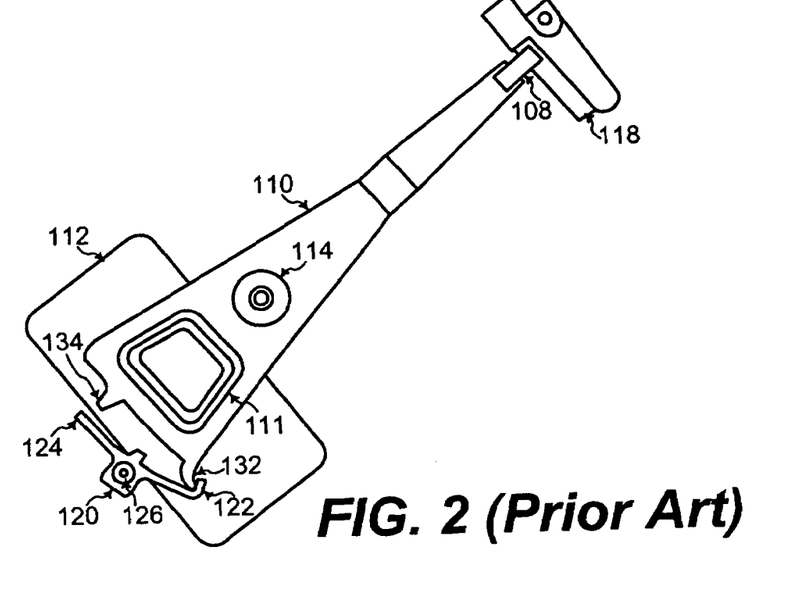
FIGS. 2 and 3 show components of a first mechanical latch for stopping rotation of an actuator of the disk drive, according to the prior art.
Figure 3:
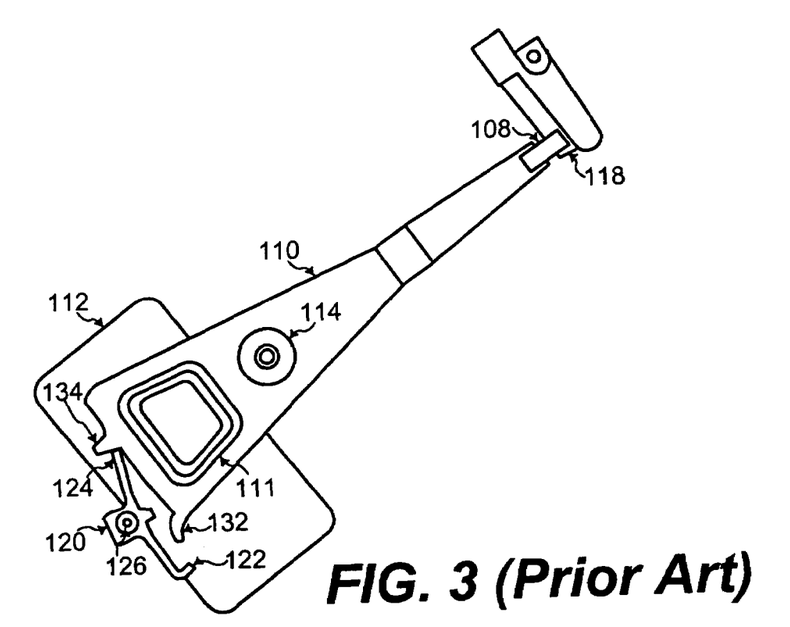

FIGS. 2 and 3 illustrate a mechanical actuator latch 120 for a disk drive as disclosed in U.S. Pat. No. 6,529,349. Elements having the same reference number in FIGS. 1, 2, and 3 refer to elements having similar structure and function.

Such an actuator latch 120 includes a hook 122 and an end 124 that pivot about a center 126 of the latch 120. In addition, a first latch portion 132 and a second latch portion 134 are formed at the distal end of the actuator 110.

Referring to FIGS. 1, 2, and 3, when an external force is applied on the disk drive 100, the actuator 110 rotates about the pivot 114 either in the clockwise or counter clockwise direction. Referring to FIG. 2, when the actuator 110 rotates in the counter clockwise direction, the first latch portion 132 of the actuator 110 becomes engaged with the hook 122 of the latch 120 to stop further counter clockwise rotation of the actuator 110. Referring to FIG. 3, when the actuator 110 rotates in the clockwise direction, the second latch portion 134 of the actuator 110 becomes engaged with the end 124 of the latch 120 to stop further clockwise rotation of the actuator 110. In this manner, the position of the transducer 108 is maintained to be within the parking zone 118 in FIGS. 2 and 3.

Figure 4:
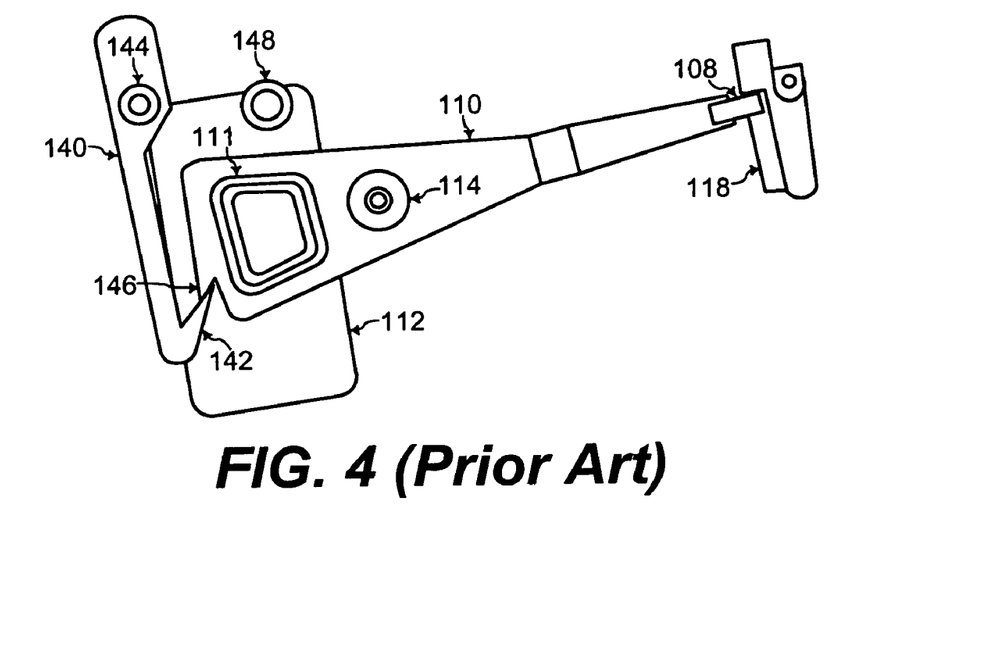
FIGS. 4 and 5 show components of a second mechanical latch for stopping rotation of the actuator of the disk drive, according to the prior art.
Figure 5:
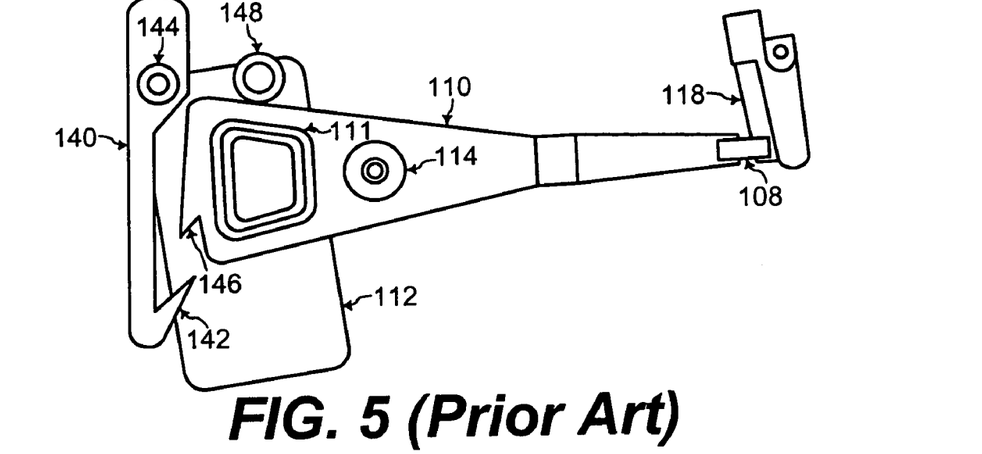

FIGS. 4 and 5 illustrate another mechanical actuator latch 140 for a disk drive as disclosed as prior art in U.S. Pat. No. 6,529,349. Elements having the same reference number in FIGS. 1, 2, 3, 4, and 5 refer to elements having similar structure and function. The latch 140 includes a hook 142 and rotates about a latch pivot 144. In addition, a notch 146 is formed at the distal end of the actuator 110. Furthermore, a crash stop 148 is formed in the disk drive.

Referring to FIG. 4, when the actuator 110 rotates in the counter clockwise direction, the notch 146 of the actuator 110 becomes engaged with the hook 142 of the latch 140 to stop further counter clockwise rotation of the actuator 10. Referring to FIG. 5, when the actuator 110 rotates in the clockwise direction, the actuator 110 contacts the crash stop 148 which forces the actuator to rotate in the counter clockwise direction such that the notch 146 of the actuator 110 becomes engaged with the hook 142 of the latch 140 as illustrated in FIG. 4. In this manner, the position of the transducer 108 is maintained to be within the parking zone 118 in FIGS. 4 and 5.

A disadvantage of such mechanical latches 120 and 140 of the prior art is that a relatively large impact force may be absorbed by the actuator 110 from contact with one of the latches 120 and 140. Thus, when an external force is applied on the disk drive 100, the latch 120 or 140 contacts the actuator 110 that absorbs such impact force. Structural stress from such force absorption disadvantageously results in noise at the transducer 108 and in mechanical damage to the actuator 110 and transducer 108 over time.

Thus, an actuator latch is desired for maintaining the position of the transducer at a parking zone with a minimized amount of force absorbed by the actuator.

SUMMARY OF THE INVENTION

Accordingly, in a general aspect of the present invention, an actuator latch for a disk drive comprises at least one damping structure disposed at a wall within a recess of a latch body. Such a damping structure absorbs impact force between the latch body and a distal end of the actuator. The recess of the latch body engages with the distal end of the actuator for maintaining the position of a transducer on the actuator within a parking zone.

In another embodiment of the present invention, the actuator latch includes a hook on the latch body that engages with a barb on the distal end of the actuator to stop rotation of the actuator. In that case, the damping structure exerts force on the distal end of the actuator for assisting the hook to become engaged with the barb.

In a further embodiment of the present invention, the actuator latch includes two damping structures, each disposed at a respective wall within the recess of the latch body. In that case, the two damping structures exert dual action force on the distal end of the actuator for assisting the hook to become engaged with the barb.

The damping structure may be advantageously comprised of one of: a compressive material adhered to the wall within the recess, a compressive material inserted into the wall within the recess, or a U-shaped structure formed on the wall within the recess.

In this manner, because the damping structure absorbs impact force from contact between the actuator and the latch body, the integrity of the actuator and the transducer is preserved over time. In addition, the damping structure applies compressive force on the distal end of the actuator with the compressive force being used toward stopping rotation of the actuator. Furthermore, with a mechanical latch instead of a magnetic latch, the position of the transducer may be maintained within the parking zone for a higher range of external force on the disk drive.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, 7, 8, 9, 10, 11, 12, 13, and 14 refer to elements having similar structure and function.

DETAILED DESCRIPTION

Figure 6:
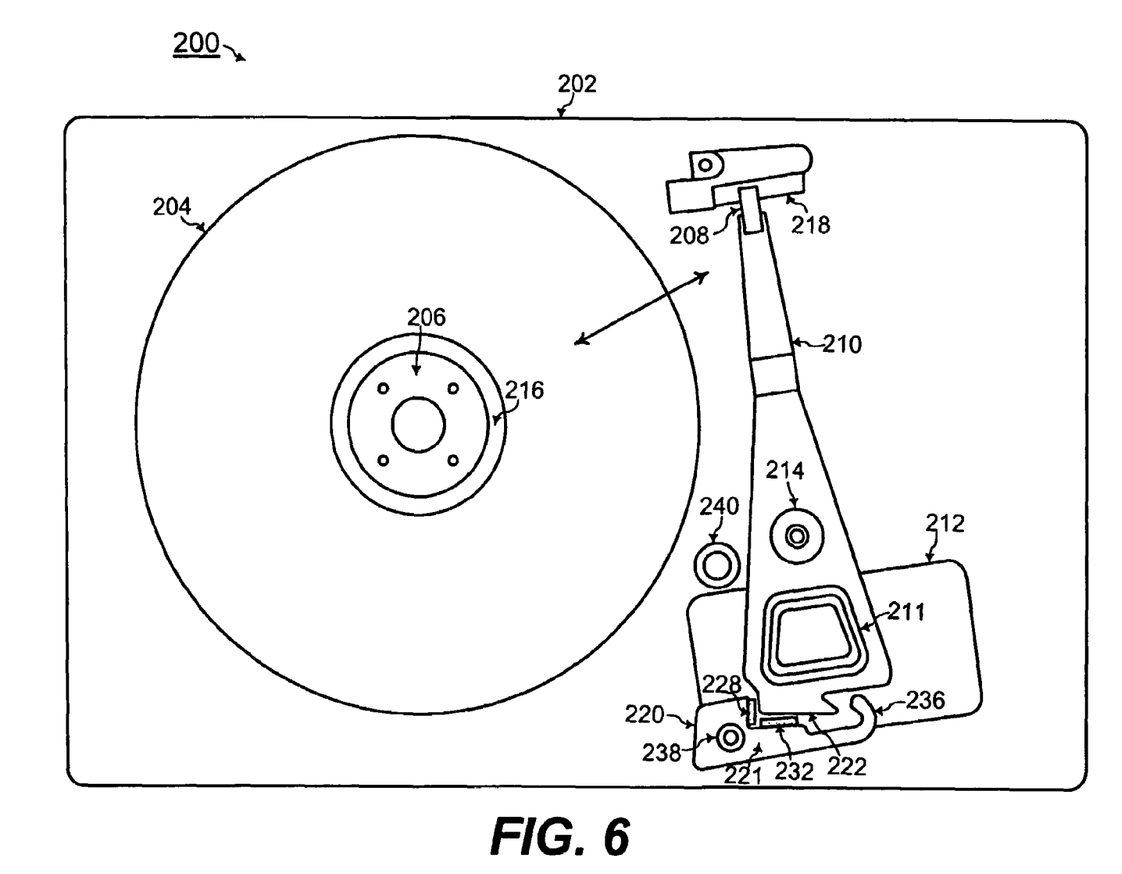
FIG. 6 shows components of a disk drive including an actuator latch with minimized impact force absorbed by the actuator of the disk drive, according to one embodiment of the present invention.

FIG. 6 shows a disk drive 200 of the present invention, and a casing 202, a disk 204, a spindle motor 206, a transducer 208, an actuator 210, a voice coil 211, magnets 212, a pivot 214, and parking zones 216 and 218 of FIG. 6 are similar in structure and function to such components described with respect to the disk drive 100 of FIG. 1. The disk drive 200 may be for a HDD (hard disk drive) for example that stores data magnetically. The disk 204 is typically part of a plurality of disks stacked for providing higher data capacity, but one disk 204 with the corresponding transducer 208 is illustrated in FIG. 6 for simplicity of illustration.

For accessing the disk 204 during a read/write operation, the disk 204 is spinning at a high enough speed such that an aerodynamic cushion is developed between the disk 204 and the transducer 208. Thus, the transducer 208 floats over the disk 204 and does not contact the disk 204 during such access. When the disk 204 is not spinning, the aerodynamic cushion is no longer available to float the transducer 208 above the disk 204. For preventing damage to the transducer 208 or the disk 204 from contact between such components, the transducer 208 is stationed at one of the parking zones 216 or 218 when the disk 204 is not spinning.

The present invention is illustrated and described for the transducer 208 situated within the parking zone 218 apart from the disk 204. However, the present invention may be applied for maintaining the transducer 208 to be situated within any other type of parking zone such as on the disk 204.

For preventing damage to the transducer 208 or the disk 204 from contact between such components, the position of the transducer 208 is desired to be maintained within the parking zone 218 even when external force is applied on the disk drive 200. Such an external force is especially likely when the disk drive 200 is part of a portable system that is prone to be bumped or dropped. Thus, the present invention includes an actuator latch 220 with a distal end 222 of the actuator 210 having a barb 224 formed thereon, as illustrated in an enlarged view of such components 220 and 222 in FIG. 7.

Figure 7:
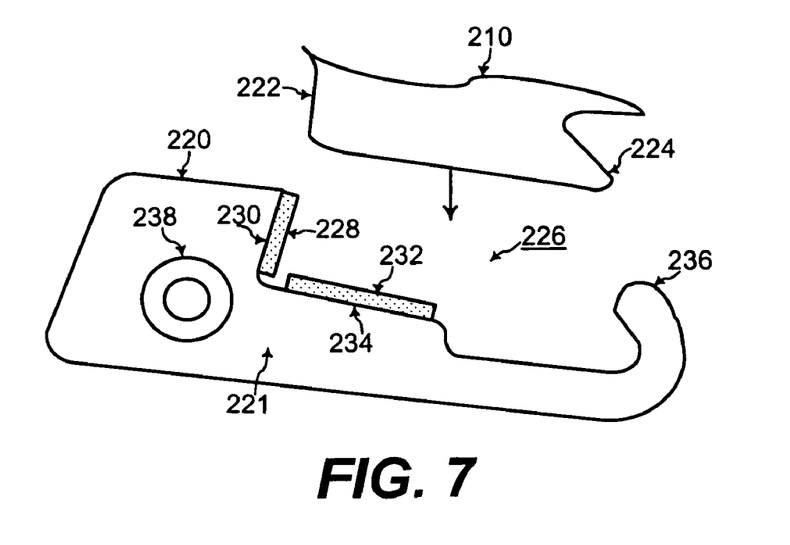
FIGS. 7, 8, 9, 10, and 11 illustrate close-up views of damping structures within a recess of a latch body during operation of the actuator latch of FIG. 6, according to one embodiment of the present invention.
Figure 8:
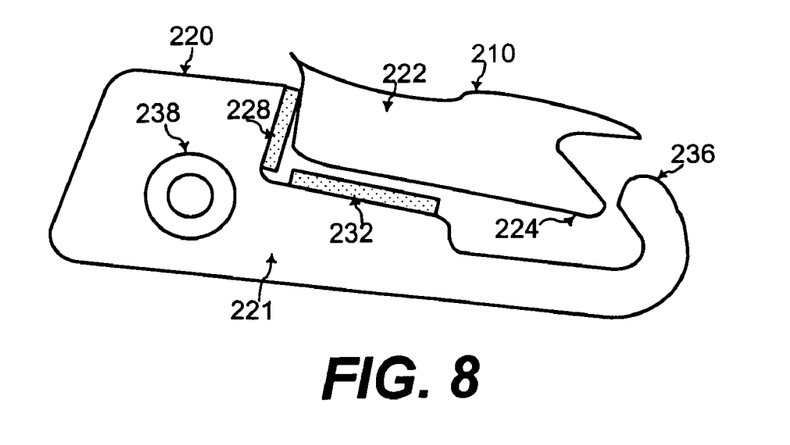

Referring to FIGS. 6, 7, and 8, a latch body 221 of the actuator latch 220 includes a recess 226 that engages with the distal end 222 of the actuator 210 when the transducer 208 is situated within the parking zone 218, as illustrated in FIG. 8. Mechanisms for engaging the distal end 222 of the actuator 210 with the recess 226 of the actuator latch 220 when the transducer 208 is landed into the parking zone 218 are known to one of ordinary skill in the art. In addition, mechanisms for disengaging the distal end 222 of the actuator 210 from the recess 226 of the actuator latch 220 when the transducer 208 is desired to float over the disk 204 for read/write access are known to one of ordinary skill in the art.

The actuator latch 220 also includes a first damping structure 228 disposed on a first wall 230 and a second damping structure 232 disposed on a second wall 234 within the recess 226. Furthermore, the actuator latch 220 includes a hook 236 on the latch body 221 and a pivot 238 through the latch body 221.

Figure 9:
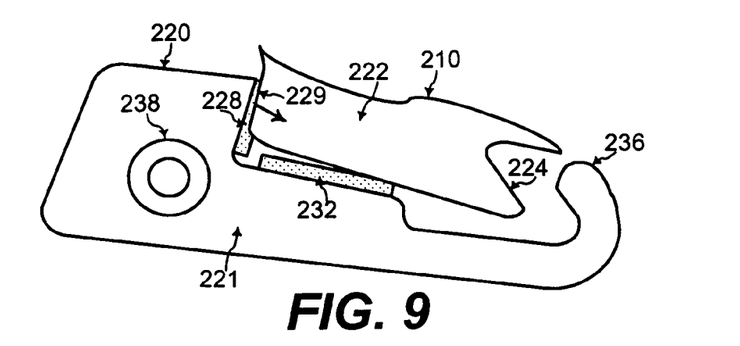
Figure 10:
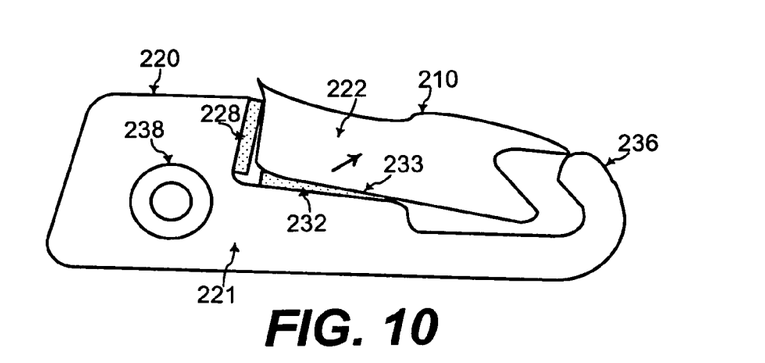
Figure 11:
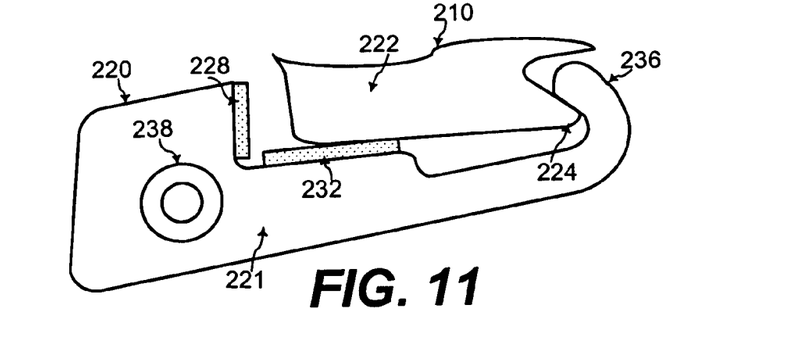

FIGS. 9, 10, and 11 illustrate operation of the actuator latch 220 with the damping structures 228 and 232. Referring to FIG. 6, when an external force is applied on the disk drive 200, the distal end 222 of the actuator 210 rotates about pivot 214. Referring to FIGS. 6 and 9, when external force is applied on the disk drive 200, a first surface 229 of the distal end 222 of the actuator 210 may contact and compress the first damping structure 228. For example, the first surface 229 of the distal end 222 contacts and compresses the first damping structure 228 when the actuator arm 210 rotates clockwise.

In one embodiment of the present invention, the damping structures 228 and 232 are comprised of a compressive material such as a sponge material for example that is adhered to the first and second walls 230 and 234, respectively, of the recess 226. In FIG. 9, such compression of the first damping structure 228 results in a compressive force from the first damping structure 228 against the first surface 229 of the distal end 222 of the actuator 210 (as illustrated by the arrow in FIG. 9). In addition, with such contact between the distal end 222 of the actuator 210 and the first damping structures 228, the latch body 221 rotates counter clockwise about the pivot 238. As a result, the distal end 222 of the actuator 210 then compresses the second damping structure 232 as illustrated in FIG. 10.

Such compression of the second damping structure 232 results in a compressive force from the second damping structure 232 against a second surface 233 of the distal end 222 of the actuator 210 (as illustrated by the arrow in FIG. 10). Such compressive force from the second damping structure 232 further assists the barb 224 of the distal end 222 of the actuator 210 to become engaged with the hook 236 of the actuator latch 220 as illustrated in FIG. 11.

Thus, in FIGS. 9 and 10, the first and second damping structures 228 and 232 provide dual action compressive force to assist the barb 224 to come engaged with the hook 236 in a faster manner. The engagement of the barb 224 with the hook 236 stops further rotation of the actuator 210. As a result, the dual action force from the first and second damping structures 228 and 232 is used toward stopping rotation of the actuator 210.

Referring to FIG. 11, if the actuator 210 rotates counter clockwise, the barb 224 of the distal end 222 of the actuator 210 becomes engaged with the hook 236 of the actuator latch 220. Such engagement of the barb 224 with the hook 236 stops further rotation of the actuator 210 such that the position of the transducer 208 is maintained to be within the parking zone 218. Referring to FIG. 6, the disk drive 200 of the present invention may also include a limit stop 240 such as the limit stop 148 of FIGS. 4 and 5 for further stopping the rotation of the actuator 210 such that the position of the transducer 208 is maintained to be within the parking zone 218. However, the present invention may be practiced with or without such a limit stop 240 within the disk drive 200.

In this manner, the distal end 222 of the actuator 210 contacts the first and second damping structures 228 and 232 within the recess 226 of the latch body 220. The first and second damping structures 228 and 232 are compressed to absorb and dampen impact force from such contact. With minimized structural stress on the actuator 210, the integrity of the actuator 210 and the transducer 208 is preserved over time, and noise at the transducer 208 is reduced.

In addition, the compressive force from each of the first and second damping structures 228 and 232 assists the barb 224 of the distal end 222 of the actuator 210 to become engaged with the hook 236 of the actuator latch 220 to stop rotation of the actuator 210 in a faster manner. With the engagement of the barb 224 with the hook 236, the position of the transducer 208 is maintained to be within the parking zone 218. Furthermore, with such a mechanical latch 220 instead of a magnetic latch, the position of the transducer 208 may be maintained to be within the parking zone 218 for a higher range of external force on the disk drive 200.

Figure 12:
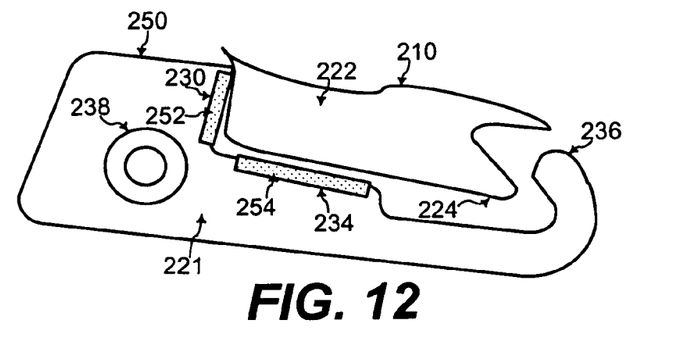
FIG. 12 illustrates a second embodiment of the present invention for implementation of the damping structures within the recess of the latch body.

FIG. 12 illustrates an alternative second embodiment of an actuator latch 250 according to the present invention. The actuator latch 250 of FIG. 12 is similar to the actuator latch 220 of FIGS. 6-11, with elements having the same reference number in FIGS. 6-12 having similar structure and function. In the actuator latch 220 of FIGS. 6-11, the first and second damping structures 228 and 232 are each a compressive material that is adhered to the walls 230 and 234, respectively, within the recess 226 of the actuator latch 220. In the embodiment of FIG. 12, first and second damping structures 252 and 254 are also comprised of a compressive material similar to such structures 228 and 232 of FIGS. 6-11.

However, in FIG. 12, the first and second damping structures 252 and 254 are inserted into the first and second walls 230 and 234, respectively, within the recess 226 of the latch body 221. A respective opening is formed within each of the first and second walls 230 and 234 such that each of the first and second damping structures 252 and 254, respectively, is inserted therein. Nevertheless, each of the damping structures 252 and 254 of FIG. 12 is compressed to absorb and dampen impact force upon contact with the distal end 222 of the actuator 210. In addition, each of the damping structures 252 and 254 provides compressive force against the distal end 222 of the actuator 210 upon contact with such compressive force being used toward stopping rotation of the actuator 210.

Figure 13:
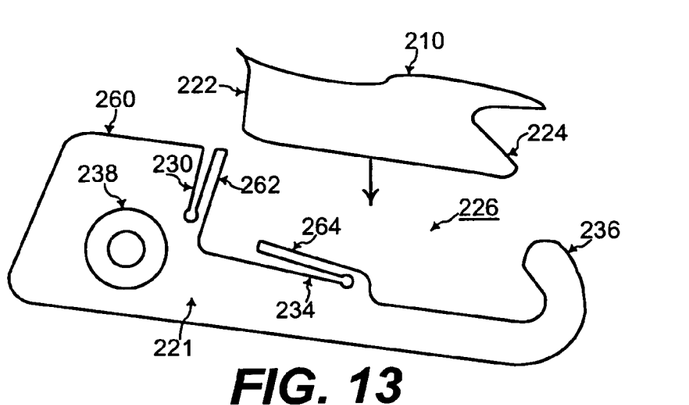
FIGS. 13 and 14 illustrate a third embodiment of the present invention for implementation of the damping structures within the recess of the latch body.

FIG. 13 illustrates an alternative third embodiment of an actuator latch 260 according to the present invention. The actuator latch 260 of FIG. 13 is similar to the actuator latch 220 or 250 of FIGS. 6-12, with elements having the same reference number in FIGS. 6-13 having similar structure and function. However, in FIG. 13, first and second damping structures 262 and 264 are each comprised of a respective U-shaped structure formed at the first and second walls 230 and 234, respectively, within the recess 226 of the latch body 221.

Figure 14:
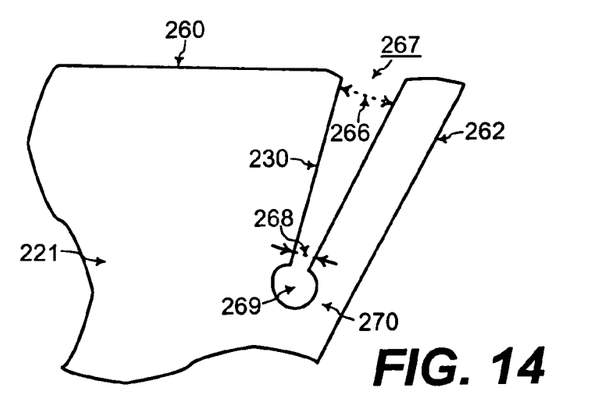

FIG. 14 illustrates an enlarged view of one of the U-shaped damping structures 262 and 264. A width 266 toward the top of a U-shaped opening 267 is larger than a width 268 toward the bottom of the U-shaped opening 267. A rounded opening 269 is formed toward the bottom of the U-shaped opening 267 to provide a thinner cantilever neck 270.

When the distal end 222 of the actuator 210 makes contact with any of the U-shaped damping structures 262 and 264, the cantilever neck 270 of such a structure bends toward the respective wall 230 or 234. Such a bent structure 262 or 264 bounds back away from the wall 230 or 234 to provide compressive force against the distal end 222 of the actuator 210 with the compressive force being used toward stopping rotation of the actuator 210. The widths 266 and 268 of the U-shaped opening 267 and the thickness of the cantilever neck 270 for each of the U-shaped structures 262 and 264 may be designed for providing a desired amount of such compressive force. In addition, each of the U-shaped damping structures 262 and 264 bends to absorb and dampen impact force upon contact with the distal end 222 of the actuator 210.

The foregoing is by way of example only and is not intended to be limiting. For example, the present invention is described in reference to an example disk 204 and corresponding transducer 208 within the disk drive 200. However, the disk drive 200 may be comprised of any number of disks with a corresponding transducer, actuator, and actuator latch of the present invention. In addition, the present invention may be practiced with any number of damping structures disposed on any number of walls within the recess of the latch body. Thus, any number of elements as illustrated and described herein are by way of example only. Furthermore, the shapes of the latch body and damping structures as illustrated and described herein are by way of example only. The present invention is limited only as defined in the following claims and equivalents thereof.

The invention claimed is:

1. An actuator latch for a disk drive, comprising:
   a latch body having a recess that engages with a distal end of an actuator of the disk drive; and two damping structures, each disposed at a respective wall within the recess of the latch body;

wherein the two damping structures exert dual action force on the distal end of the actuator with the dual action force being used toward stopping rotation of the actuator.

2. The actuator latch of claim 1, further comprising:
a hook on the latch body that engages with a barb on the distal end of the actuator to stop rotation of the actuator.

3. The actuator latch of claim 2, further comprising:
a pivot through the latch body that rotates about the pivot to cause the hook to become engaged with the barb.

4. The actuator latch of claim 1, wherein the damping structure exerts force on the distal end of the actuator with the force being used toward stopping rotation of the actuator.

5. An actuator latch for a disk drive, comprising:
a latch body having a recess that engages with a distal end of an actuator of the disk drive; and
at least one damping structure disposed at a wall within the recess of the latch body;
wherein the damping structure is comprised of one of: a compressive material adhered to the wall within the recess, a compressive material inserted into the wall within the recess, or a U-shaped structure formed on the wall within the recess.

6. The actuator latch of claim 5, further comprising:
a hook on the latch body that engages with a barb on the distal end of the actuator to stop rotation of the actuator.

7. The actuator latch of claim 6, further comprising:
a pivot through the latch body that rotates about the pivot to cause the hook to become engaged with the barb.

8. The actuator latch of claim 5, wherein the damping structure exerts force on the distal end of the actuator with the force being used toward stopping rotation of the actuator.

9. An actuator latch for a disk drive, comprising:
a latch body having a recess that engages with a distal end of an actuator of the disk drive; and
means for damping impact force when the distal end of the actuator contacts at least one wall within the recess;
wherein the means for damping further includes means for exerting dual action force on the distal end of the actuator with the dual action force being used toward stopping rotation of the actuator.

10. The actuator latch of claim 9, further comprising:
means for engaging a hook of the latch body with a barb of the distal end of the actuator to stop rotation of the actuator.

11. The actuator latch of claim 9, wherein the means for damping further includes means for exerting force on the distal end of the actuator with the force being used toward stopping rotation of the actuator.

12. A disk drive, comprising:
an actuator for moving a transducer mounted thereon with respect to a disk; and
an actuator latch including:
a latch body having a recess that engages with a distal end of the actuator; and
two damping structures, each disposed at a respective wall within the recess of the latch body;
wherein the two damping structures exert dual action force on the distal end of the actuator with the dual action force being used toward stopping rotation of the actuator.

13. The disk drive of claim 12, wherein the actuator latch further includes:
a hook on the latch body that engages with a barb on the distal end of the actuator to stop rotation of the actuator.

14. The disk drive of claim 12, wherein the damping structure exerts force on the distal end of the actuator with the force being used toward stopping rotation of the actuator.

15. A disk drive, comprising:
an actuator for moving a transducer mounted thereon with respect to a disk; and
an actuator latch including:
a latch body having a recess that engages with a distal end of the actuator; and
at least one damping structure disposed at a wall within the recess of the latch body;
wherein the damping structure is comprised of one of: a compressive material adhered to the wall within the recess, a compressive material inserted into the wall within the recess, or a U-shaped structure formed on the wall within the recess.

16. The disk drive of claim 15, wherein the actuator latch further includes:
a hook on the latch body that engages with a barb on the distal end of the actuator to stop rotation of the actuator.

17. The disk drive of claim 15, wherein the damping structure exerts force on the distal end of the actuator with the force being used toward stopping rotation of the actuator.

18. A method for latching an actuator within a disk drive, comprising:
engaging a distal end of the actuator within a recess of a latch body;
damping impact force when the distal end of the actuator contacts at least one wall within the recess;
engaging a barb on the distal end of the actuator with a hook on the latch body to stop rotation of the actuator; and
exerting dual action force on the distal end of the actuator with the force being used toward stopping rotation of the actuator.

19. A method for latching an actuator within a disk drive, comprising:
engaging a distal end of the actuator within a recess of a latch body;
damping impact force when the distal end of the actuator contacts at least one wall within the recess;
engaging a barb on the distal end of the actuator with a hook on the latch body to stop rotation of the actuator; and
wherein the step of damping is performed using one of: a compressive material adhered to the wall within the recess, a compressive material inserted into the wall within the recess, and a U-shaped structure formed on the wall within the recess.

20. The method of claim 19, wherein the step of damping further includes the step of:
exerting force on the distal end of the actuator with the force being used toward stopping rotation of the actuator.

* * * * *